US010762424B2

(12) United States Patent
Nazari et al.

(10) Patent No.: US 10,762,424 B2
(45) Date of Patent: Sep. 1, 2020

(54) METHODS AND SYSTEMS FOR REINFORCEMENT LEARNING

(71) Applicant: SAS Institute Inc., Cary, NC (US)

(72) Inventors: Mohammad Reza Nazari, Bethlehem, PA (US); Afshin Oroojlooy Jadid, Bethlehem, PA (US); Mustafa Kabul, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/127,716

(22) Filed: Sep. 11, 2018

(65) Prior Publication Data

US 2019/0102676 A1 Apr. 4, 2019

Related U.S. Application Data

(60) Provisional application No. 62/556,960, filed on Sep. 11, 2017, provisional application No. 62/572,200, filed on Oct. 13, 2017.

(51) Int. Cl.
*G06N 3/08* (2006.01)
*G06N 3/04* (2006.01)
(Continued)

(52) U.S. Cl.
CPC ......... *G06N 3/08* (2013.01); *G06F 16/24568* (2019.01); *G06F 17/18* (2013.01);
(Continued)

(58) Field of Classification Search
CPC .......... G06N 3/08; G06N 20/00; G06N 3/006; G06N 3/04; G06N 3/0472; G06N 3/049;
(Continued)

(56) References Cited

U.S. PATENT DOCUMENTS 5,448,681 A 9/1995 Khan
6,192,354 B1 2/2001 Bigus et al.
(Continued)

OTHER PUBLICATIONS

James Supancic, III and Deva Ramanan, "Tracking as Online Decision-Making: Learning a Policy from Streaming Videos with Reinforcement Learning", Jul. 17, 2017, arXiv, pp. 1-11. (Year: 2017).*

(Continued)

*Primary Examiner* — Kamran Afshar
*Assistant Examiner* — Ying Yu Chen

(57) ABSTRACT

Exemplary embodiments can maximize long-term value in a machine learning system. The system may employ an offline training process and an online training process. In the offline training process, an initial policy is learned to provide a warm start to the online training process. In the online training process, the system applies concurrent reinforcement learning across multiple environments, with the goal of learning efficient policies in real time from in-flight user data in one environment, and applying the learned policies to other environments. With the combination of offline training and online training, the system is able to improve initial performance through the warm start, while adapting to a changing context through concurrent reinforcement learning.

30 Claims, 16 Drawing Sheets

(51) Int. Cl.

| | |
|---|---|
| ***G06F 17/18*** | (2006.01) |
| ***G06K 9/62*** | (2006.01) |
| ***G06N 20/00*** | (2019.01) |
| ***G06F 16/2455*** | (2019.01) |
| ***G06K 9/00*** | (2006.01) |
| ***G06N 3/00*** | (2006.01) |

(52) U.S. Cl.
CPC ......... *G06K 9/00496* (2013.01); *G06K 9/627* (2013.01); *G06K 9/6256* (2013.01); *G06N 3/006* (2013.01); *G06N 3/04* (2013.01); *G06N 3/049* (2013.01); *G06N 3/0472* (2013.01); *G06N 20/00* (2019.01); *G06K 2209/19* (2013.01)

(58) Field of Classification Search
CPC .............. G06F 16/24568; G06F 17/18; G06K 9/00496; G06K 9/6256; G06K 9/627; G06K 2209/19
See application file for complete search history.

(56) References Cited

U.S. PATENT DOCUMENTS

| | | | |
|---|---|---|---|
| 6,353,814 | B1 | 3/2002 | Weng |
| 6,529,887 | B1 | 3/2003 | Doya et al. |
| 6,882,992 | B1 | 4/2005 | Werbos |
| 7,552,030 | B2 | 6/2009 | Guralnik et al. |
| 7,606,714 | B2 | 10/2009 | Williams et al. |
| 7,707,131 | B2 | 4/2010 | Chickering et al. |
| 8,296,182 | B2 | 10/2012 | Chari et al. |
| 8,429,097 | B1 | 4/2013 | Sivasubramanian et al. |
| 8,886,641 | B2 | 11/2014 | Dong et al. |
| 8,918,866 | B2 | 12/2014 | Luo et al. |
| 8,943,008 | B2 | 1/2015 | Ponulak et al. |
| 9,008,840 | B1 | 4/2015 | Ponulak et al. |
| 9,373,323 | B2 | 6/2016 | Williams |
| 9,679,258 | B2 | 6/2017 | Mnih et al. |
| 2004/0073764 | A1 | 4/2004 | Andreasson |
| 2013/0325774 | A1 | 12/2013 | Sinyayskiy et al. |
| 2013/0325776 | A1 | 12/2013 | Ponulak et al. |
| 2014/0025613 | A1 | 1/2014 | Ponulak |

OTHER PUBLICATIONS

Arthur Juliani, "Simple Reinforcement Learning in Tensorflow: Part 1—Two-armed Bandit", Jun. 14, 2016, https://medium.com/@awjuliani/super-simple-reinforcement-learning-tutorial-part-1-fd544fab149 pp. 1-4. (Year: 2016).*

Christopher J. Gatti and Mark J. Embrechts, "Chapter 11 Reinforcement Learning with Neural Networks: Tricks of the Trade", 2012, Adv. in Intelligent Signal Processing and Data Mining, SCI 410, Springer-Verlag Berlin Heidelberg, pp. 275-310. (Year: 2012).*

Danijar Hafner, James Davidson, and Vincent Vanhoucke, "TensorFlow Agents: Efficient Batched Reinforcement Learning in TensorFlow", Sep. 8, 2017, arXiv, pp. 1-8. (Year: 2017).*

Shayegan Omidshafiei, Jason Pazis, Christopher Amato, Jonathan P. How, and John Vian, "Deep Decentralized Multi-task Multi-Agent Reinforcement Learning under Partial Observability", Aug. 6, 2017, ICML'17 Proceedings of the 34th International Conference on Machine Learning, vol. 70, pp. 1-10. (Year: 2017).*

Ah-Hwee Tan, Ning Lu, and Dan Xiao, "Integrating Temporal Difference Methods and Self-Organizing Neural Networks for Reinforcement Learning With Delayed Evaluative Feedback", Feb. 2008, IEEE Transactions on Neural Networks, vol. 19, No. 2, pp. 230-244. (Year: 2008).*

Bowen Baker, Otkrist Gupta, Nikhil Naik, and Ramesh Raskar, "Designing Neural Network Architectures Using Reinforcement Learning", Mar. 22, 2017, arXiv, pp. 1-18. (Year: 2017).*

L. Torrey & J. Shavlik (2009). Transfer Learning. in E. Soria, J. Martin, R. Magdalena, M. Martinez & A. Serrano, editor, Handbook of Research on Machine Learning Application. IGI Global.

Kober et al., "Reinforcement learning in robotics: A survey" the International Journal of Robotics Research—2013.

Hasselt et al., "Deep Reinforcement Learning with Double Q-Learning" Proceedings of the Thirthieth AAAI Conference on Artificial Intellifence (AAAI-2016).

Dayan, Peter, "Motivated Reinforcement Learning" Advances in Neural Information Processing Systems 14 (NIPS 2001).

Author Unknown, "A Beginner's Guide to Deep Reinforcement Learning" Skymind—A.I. Wiki—retrieved Apr. 29, 2019.

Buşoniu et al., "Reinforcement learning and dynamic programming using function approximators" CRC Press—Published Apr. 29, 2010.

Doya et al., "Multiple Model-based Reinforcement Learning" Nov. 2, 2001—Human Information Science Laboratories, ATR International.

Mnih et al., "Human-level control through deep reinforcement learning"—International Journal of Science—Feb. 25, 2015.

Wu et al., "A Novel multi-agent reinforcement learning approach for job scheduling in Grid computing" Elsevier—Future Generation Computer Systems 27 (2011).

Sagar, Chaitanya, "How to perform reinforcement learning with R" Feb. 5, 2018—Dataaspirant.

Maia,Taigo V., "Reinforcement learning, conditioning, and the brain: Successes and challenges" Cognitive, Affective, & Behavioral Neuroscience—2009.

Author Unknown, "Meta-Reinforcement Learning" Floydhub—retrieved Apr. 27, 2019.

Littman, Michael L., "Markov games as a framework for multi-agent reinforcement learning" in Proceedings of the Eleventh International Conference on Machine Learning—1994.

Buşoniu et al., "Multi-agent Reinforcement Learning: An Overview" ResearchGate—2010.

Author Unknown, "Reinforcement learning" GeeksforGeeks—retrieved Apr. 29, 2019.

Author Unknown, "Reinforcement learning" Wikipedia—retrieved Apr. 29, 2019.

Proellochs, Nicolas, "Reinforcement learning in R" Copyright (c) 2017 Nicolas Pröllochs & Stefan Feuerriegel.

Author Unknown, "Reinforcement learning tutorial using Python and Keras"—Adventures in Machine Learning—retrieved Apr. 29, 2019.

Kurama, Vihar, "Reinforcement Learning with Python" Toward Data Science—retrieved Apr. 29, 2019.

Kansai, Satwik and Martin, Brendan, "Reinforcement Q-Learning from Scratch in Python with OpenAI Gym" LearnDataSci—Retrieved Apr. 29, 2019.

Britz, Denny, "Implementation of Reinforcement Learning Algorithms. Python, OpenAI Gym, Tensorflow" GitHub—Retrieved Apr. 29, 2019.

* cited by examiner

METHODS AND SYSTEMS FOR REINFORCEMENT LEARNING

RELATED APPLICATIONS

This application claims the benefit of priority to U.S. Provisional Patent Application Ser. No. 62/556,960, filed on Sep. 11, 2017, and to U.S. Provisional Patent Application 62/572,200, filed on Oct. 13, 2017. The contents of the aforementioned applications are incorporated herein by reference.

BACKGROUND

Exemplary embodiments described herein are directed to the problem of finding an efficient online control policy, in which a learner agent interacts with an environment. The learner agent may take actions in the environment and accrue some amount of value as a consequence of the actions. For example, in some implementations, the learner agent may employ a robotic device that is used to lift and transport heavy steel beams in an outdoor building environment, or a robotic arm that is used to repair parts on various machines in an industrial factory environment. The robotic device or arm may require maintenance on a periodic schedule, but experiences downtime while undergoing maintenance. On the other hand, if the robotic device/arm breaks due to lack of maintenance, a much longer downtime may be experienced. The goal of the agent may be to maximize the average long-term value accrued. In this example, the actions taking may include taking the robotic device/arm offline for maintenance, and the value may be represented as the long-term uptime of the robotic device/arm.

Often, such agents are embodied as a machine learning system, and may be trained using, for example, reinforcement learning. In reinforcement learning, a model simulates the dynamics of the environment with which the agent interacts. Accordingly, the agent can experiment with many different actions and identify some of the consequences of the actions. However, it is typically not possible to propagate a single interaction trajectory through time in order to learn a policy. In most real-world situations the model of the environment that the agent interacts with is not fully known a priori, because future dynamics cannot be predicted with complete accuracy. Maximizing the accrued value over time can be difficult in these circumstances.

These problems tend to be compounded when the system must deal with a changing context, such as when the value accrued depends on the actions or preferences of human actors (which can change over time and may not be entirely predictable). Existing reinforcement learning techniques generally require a significant amount of time and computer processing resources to adjust the model in response to a change in the environment. This may be disastrous when the environmental change requires quick action; it would be desirable for the system to change its actions within a few interactions and without waiting for the end of a predetermined time horizon to update its decision making.

Still further, the user preferences may not be monolithic. Different users may prefer different actions to different degrees and at different times, and hence the system must be particularly careful at each possible interaction point.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

In view of the above-described problems, it is desirable to utilize a model-free algorithm for online interactions. Model-free algorithms more readily adapt to changing environment dynamics than model-based algorithms. However, model-free algorithms have a problem in that an extensive exploration time is required before the algorithm can adopt a workable policy. In real-world scenarios, the consequences of such an extensive ramp-up time can be severe in terms of lost value and lost resources.

To overcome this issue, exemplary embodiments employ an online training stage in which an approximate model of the environment is used to initially train a reasonable starting policy. This starting policy is used to warm-start an offline stage, which relies on model-free algorithms (e.g., a Deep Concurrent Temporal Difference, or "DCTD," algorithm). The model-free algorithm may interact with multiple different environments and may make changes in the policy based on the actions taken. Thus, consequences observed in one environment may be rapidly applied to change the policy before interacting with a second environment. Accordingly, the online algorithm can rapidly adapt to changing conditions.

Therefore, according to exemplary embodiments, methods, mediums, and systems are described for training an agent that selects from among a plurality of available actions to maximize an expected value over time.

In order to achieve this goal, a model of an environment may be built using historical information about the environment. The historical information about the environment may be represented a set of dynamics, where each dynamic includes: a current state of the environment; an action to be performed; a value associated with the action; and a next state of the environment to which the current state transitions after taking the action. Optionally, each dynamic may also include a set of next states and a probability of transitioning to each of the next states given that the action is taken.

The actions that may be taken in the environment may depend on the particular application. For instance, the actions may relate to predictive maintenance in a network, to inbound marketing, to outbound marketing, etc. Some examples include: taking devices offline for servicing; adding a new server to a virtual cluster (or removing a server from a virtual cluster); purchasing a book for library circulation; sending out an advertising campaign by mail, phone, electronic communication, etc. (or refraining from doing so for the present time); etc.

More generally, the action may be any act an agent is capable of taking at a given time. Accordingly, an environment may be associated with a list of possible actions, some of which may be available at any given time (and, in certain embodiments, some of which may not be available at all times). Each action is associated with the accrual of some amount of value, which may accrue immediately, in the future, or a combination. The value may depend on the application, and may be (for example): device uptime; network bandwidth; cost; patron satisfaction or retention; revenue; etc.

An initial policy may be trained using an offline process acting on the model of the environment. The policy may be represented by a number of policy weights that prioritize between available actions to identify a selected action. The offline training may include: (1) at each of multiple time steps, receiving the environment dynamics and storing the environment dynamics in a memory; (2) at each of the time steps, selecting an action from among available actions based on the policy weights; (3) repeating (1) and (2) until a final time step is reached; (4) at the final time step, determining a total value amount given the selected actions; (5) comparing the total value for different training sessions defined by different starting policy weights; and (6) selecting the policy weights from among the different policy weights based on which of the policy weights maximize the total value.

Using the initial policy as described herein may reduce a number of errors associated with applying the initial policy in the first live environment and increase the expected value over time as compared to a system in which the initial policy is not developed using the offline algorithm.

The initial policy from the offline process may be incorporated into an online process acting in a first live environment. The first live environment may be defined by an online stream of information describing present dynamics of the first live environment. The dynamics may represent a state of a real-world system and/or user interactions with the environment.

Within the first live environment, a number of possible actions that may be taken may be identified. The possible actions to be taken in the first live environment may be defined by the dynamics associated with a current state of the environment as defined by the online stream of information.

Using the online process, one of the actions may be selected based on the online process' evaluation of a value over time resulting from the actions in view of the present dynamics of the first live environment in view of the policy weights. A value associated with the selected action may be observed, and the online process may be retrained by updating the policy weights based on the observed value. Updating the policy weights may cause a reduction in a temporal difference error in the online process.

In some embodiments, the policy weights may be updated based on observation of multiple live environments at once. To this end, the agent may interact with multiple live environments in parallel by taking actions in respective environments during overlapping periods of interaction. The live environments may be divided into different training batches, and at least one live environment may be permitted to appear in multiple batches. Respective values for respective actions may be observed in each of the live environments. The observed values from each environment may be aggregated together, and the policy weights may be updated based on the aggregated value.

The online process may be configured to capture changes of dynamics in the environment caused by changing one or more of the reward for taking the action or the probability of transitioning to a next state given that the action is taken. In one embodiment, the online process may be a deep concurrent temporal difference (DCTD) algorithm that applies a deep neural network to a model-free reinforcement learning method.

The retrained online process may be applied via application logic in a second live environment defined by a different online stream of information defining different dynamics as compared to the first live environment.

Exemplary embodiments may be used for, among other things, predictive maintenance in a network of connected devices. For example, the above-described actions may involve taking a device offline for maintenance with the goal of reducing future downtime (e.g., due to system failures). The above-described value may be an uptime, bandwidth, or other usage metric for the network. Thus, by removing a device in the short-term (thereby potentially incurring a cost or penalty), the long-term usage of the network may be improved, although usage improvements are not guaranteed—for instance, the predictive maintenance may be unnecessary because the likelihood of device failure is low. By applying the combination of the offline and online training process, the system can make better decisions to improve long-term network usage.

Other envisioned applications include inbound marketing (where users approach a particular marketing entity, such as by visiting a website on which the entity's advertisements are present) and outbound marketing (where the marketing entity sends their marketing materials to potential customers). In either case, the offline training process allows the system to make better decisions regarding the marketing to be presented to particular users when initially deployed, while the online process allows the system to adapt to user's changing preferences over time.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive. [0001] Systems depicted in some of the figures may be provided in various configurations. In some embodiments, the systems may be configured as a distributed system where one or more components of the system are distributed across one or more networks in a cloud computing system.

Figure 1:
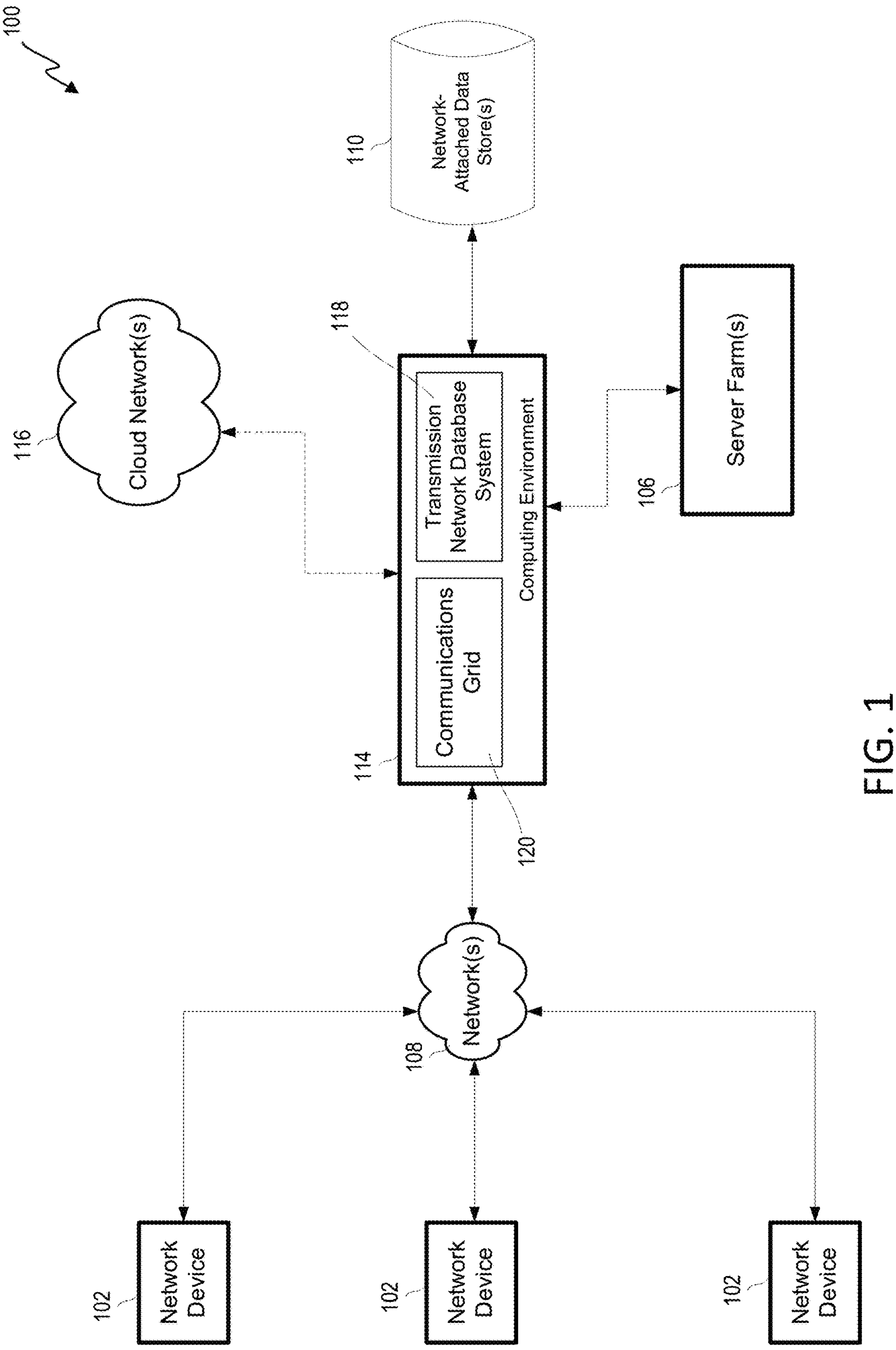
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
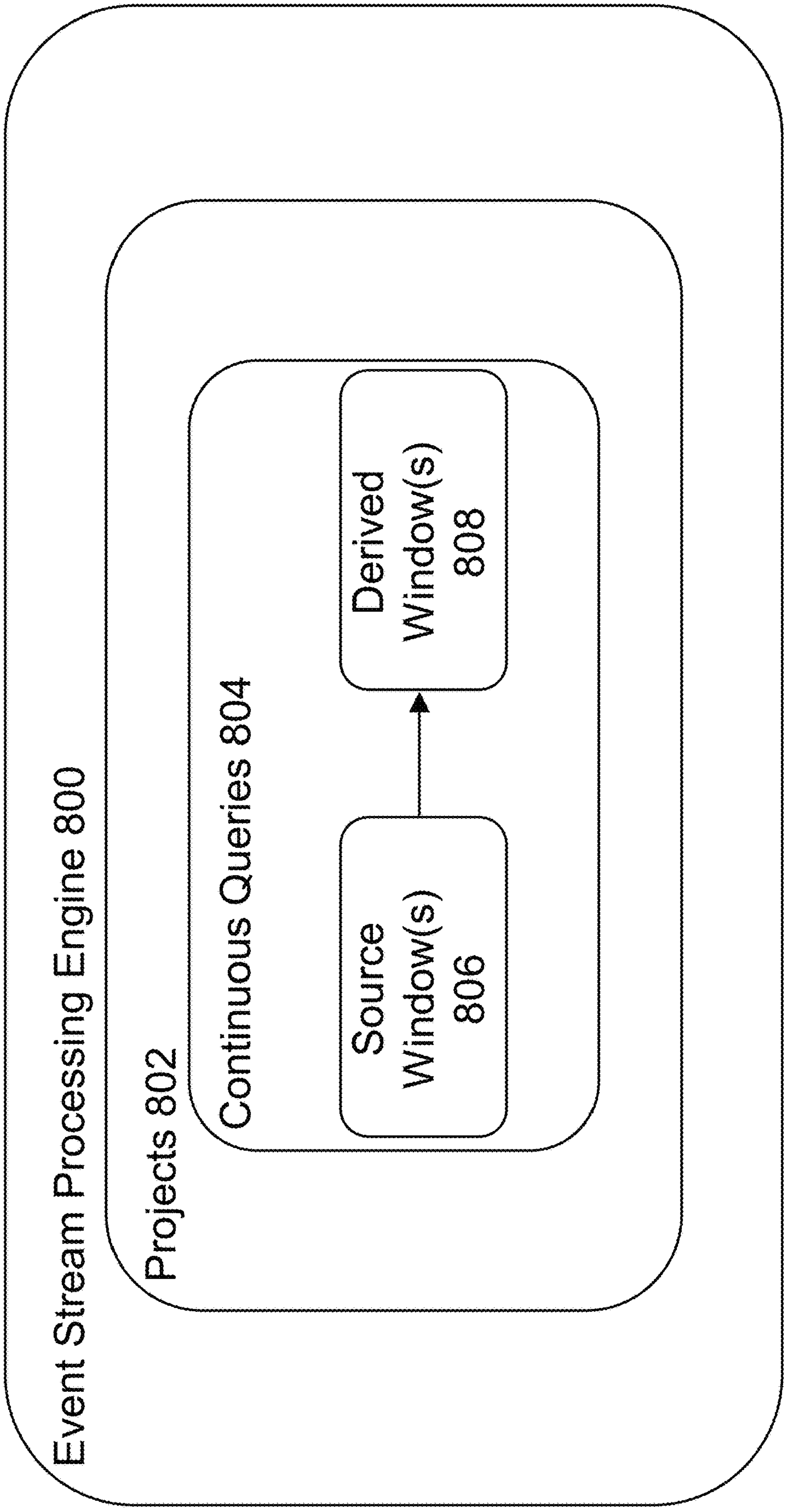
FIG. 8 illustrates a block diagram including components of an Event Stream Processing Engine (ESPE), according to embodiments of the present technology.
Figure 9:
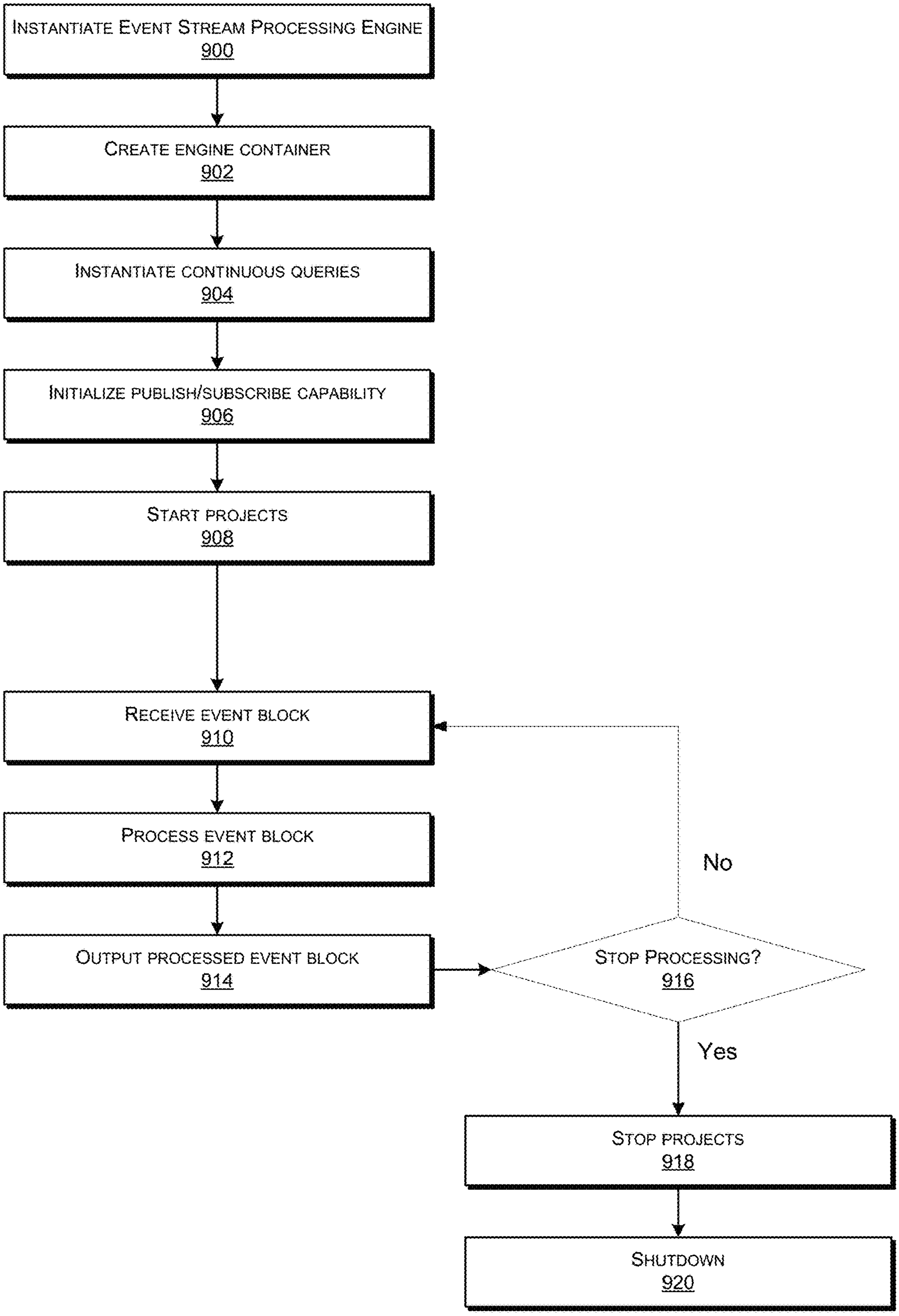
FIG. 9 illustrates a flow chart showing an example process including operations performed by an event stream processing engine, according to some embodiments of the present technology.
Figure 10:
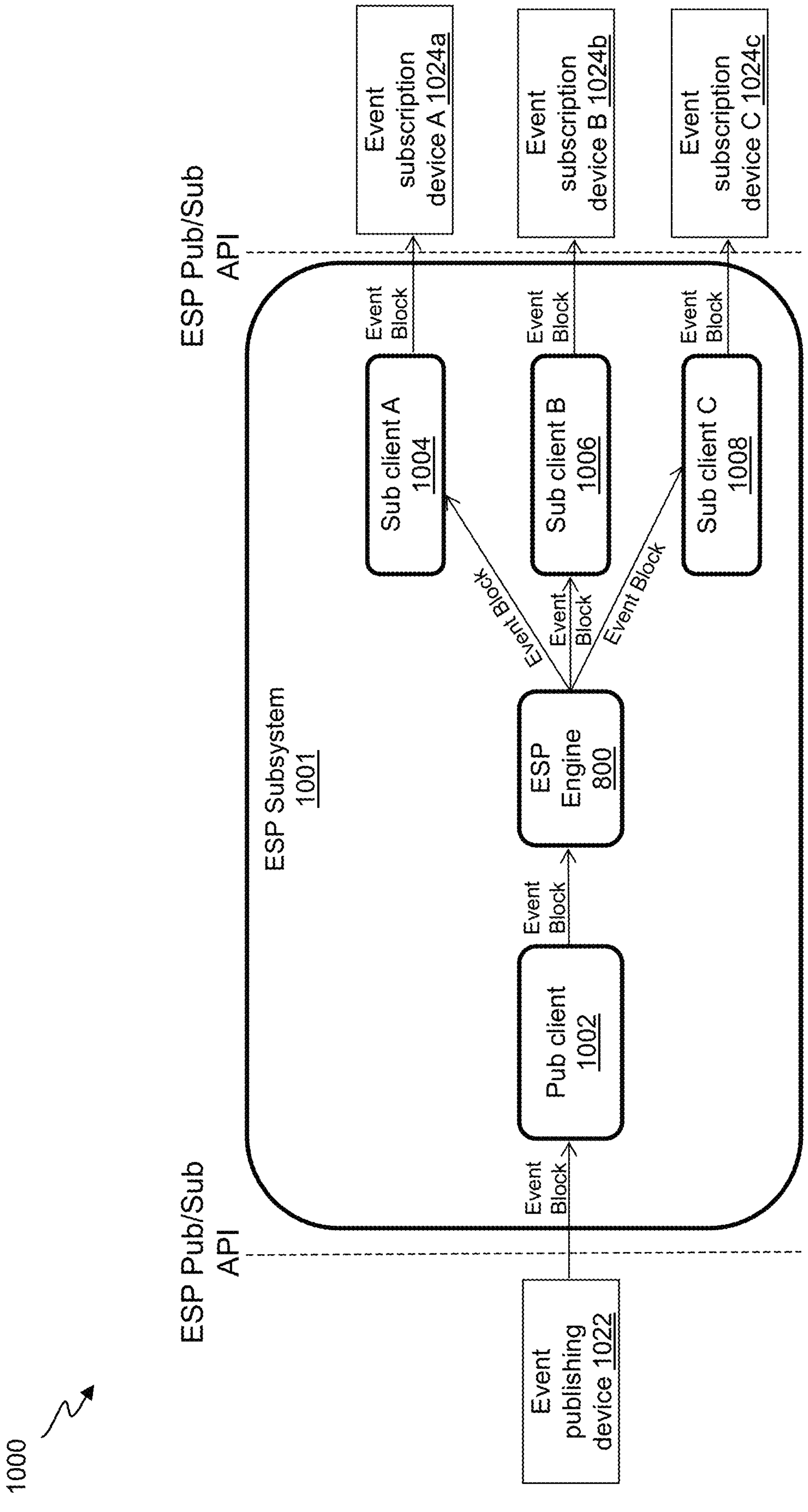
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw)

data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
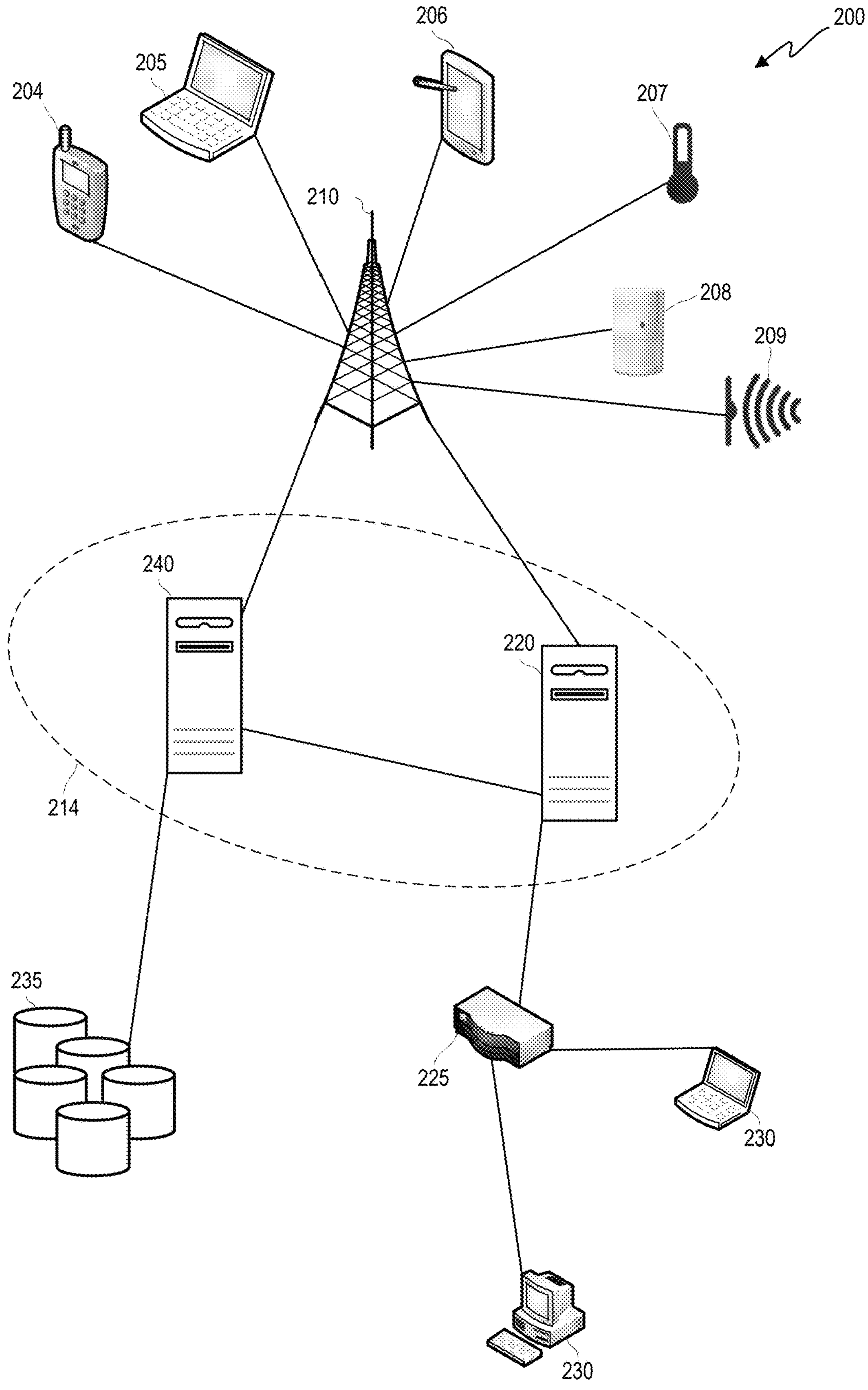
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
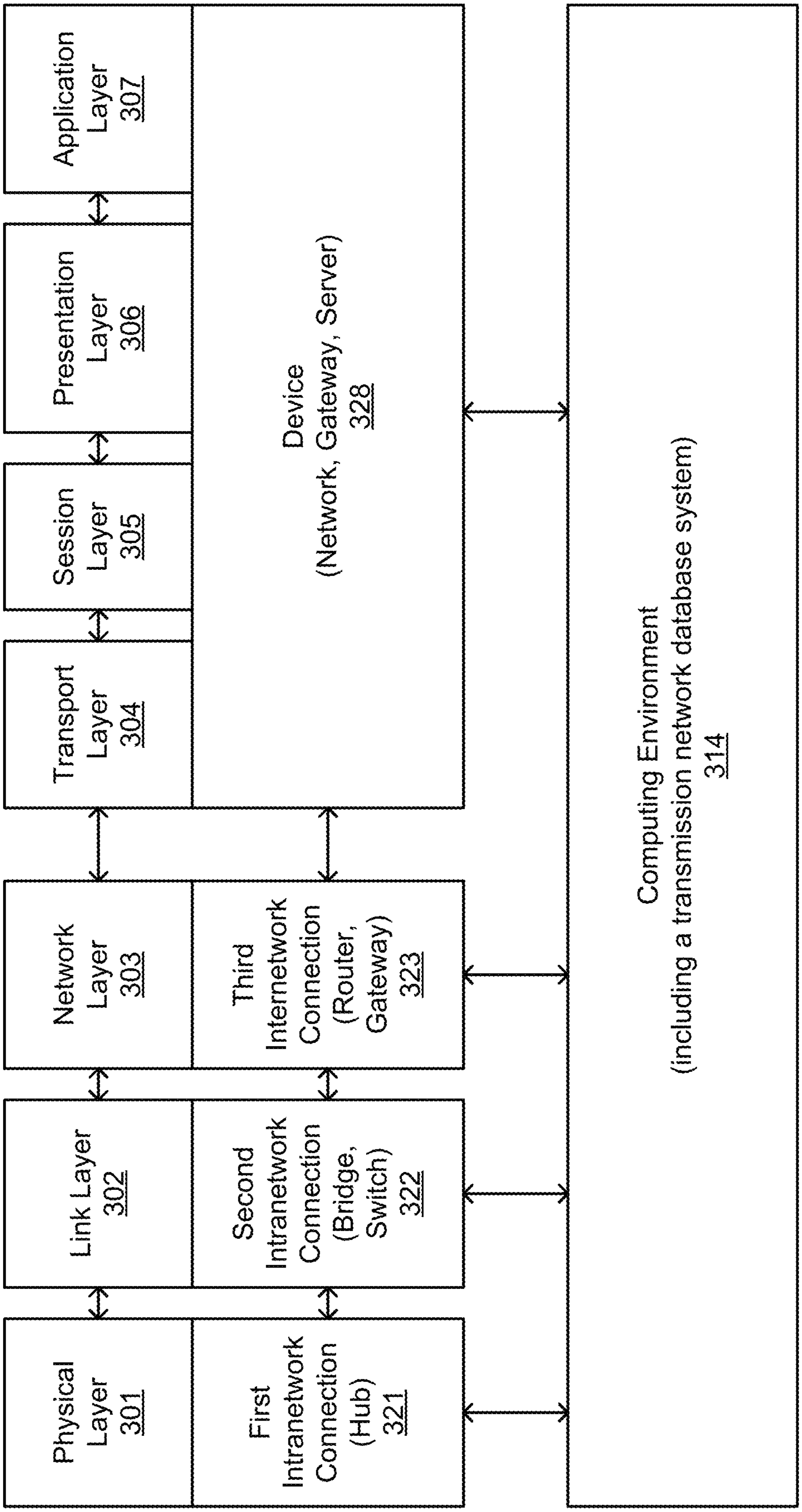
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
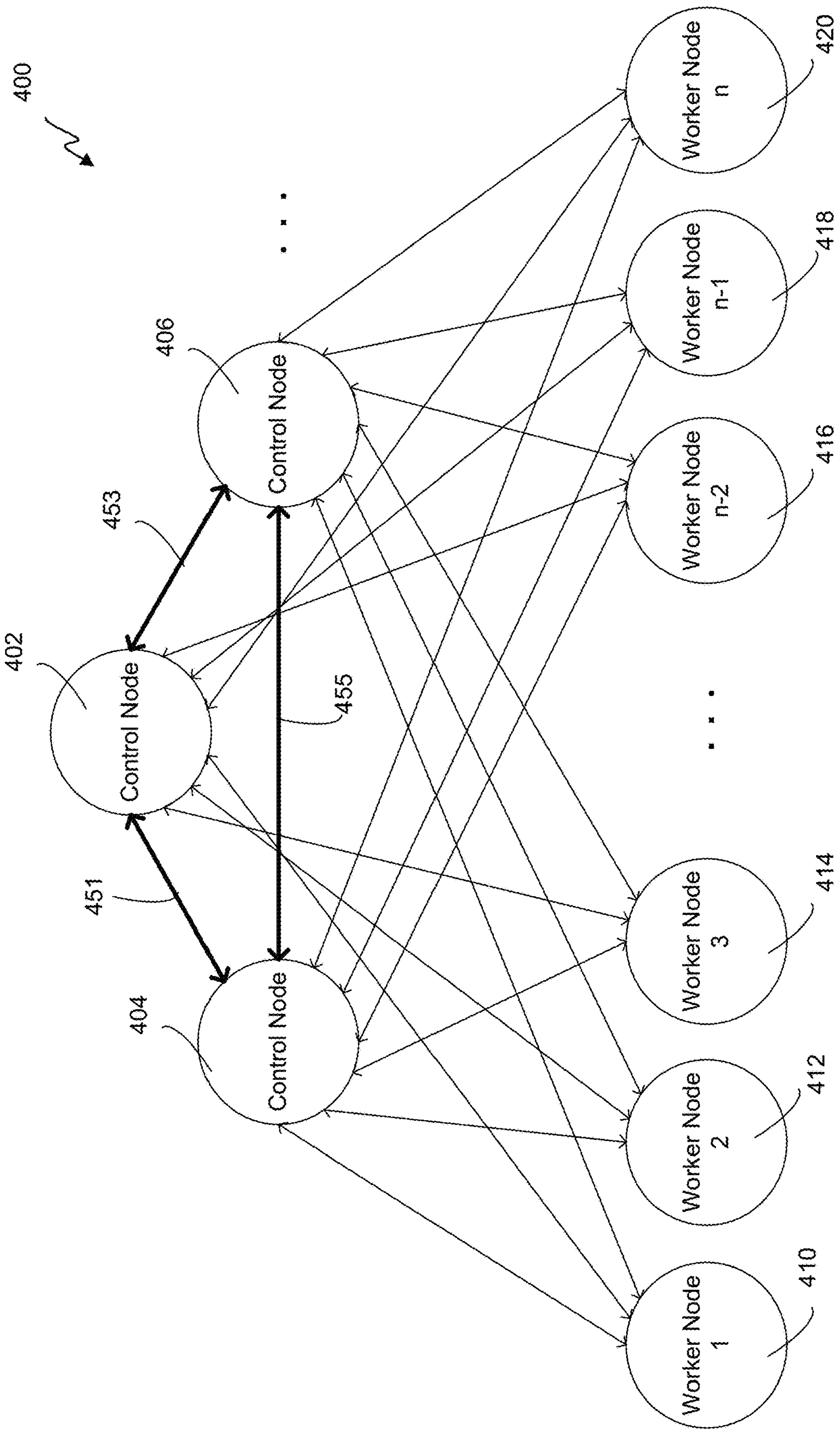
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
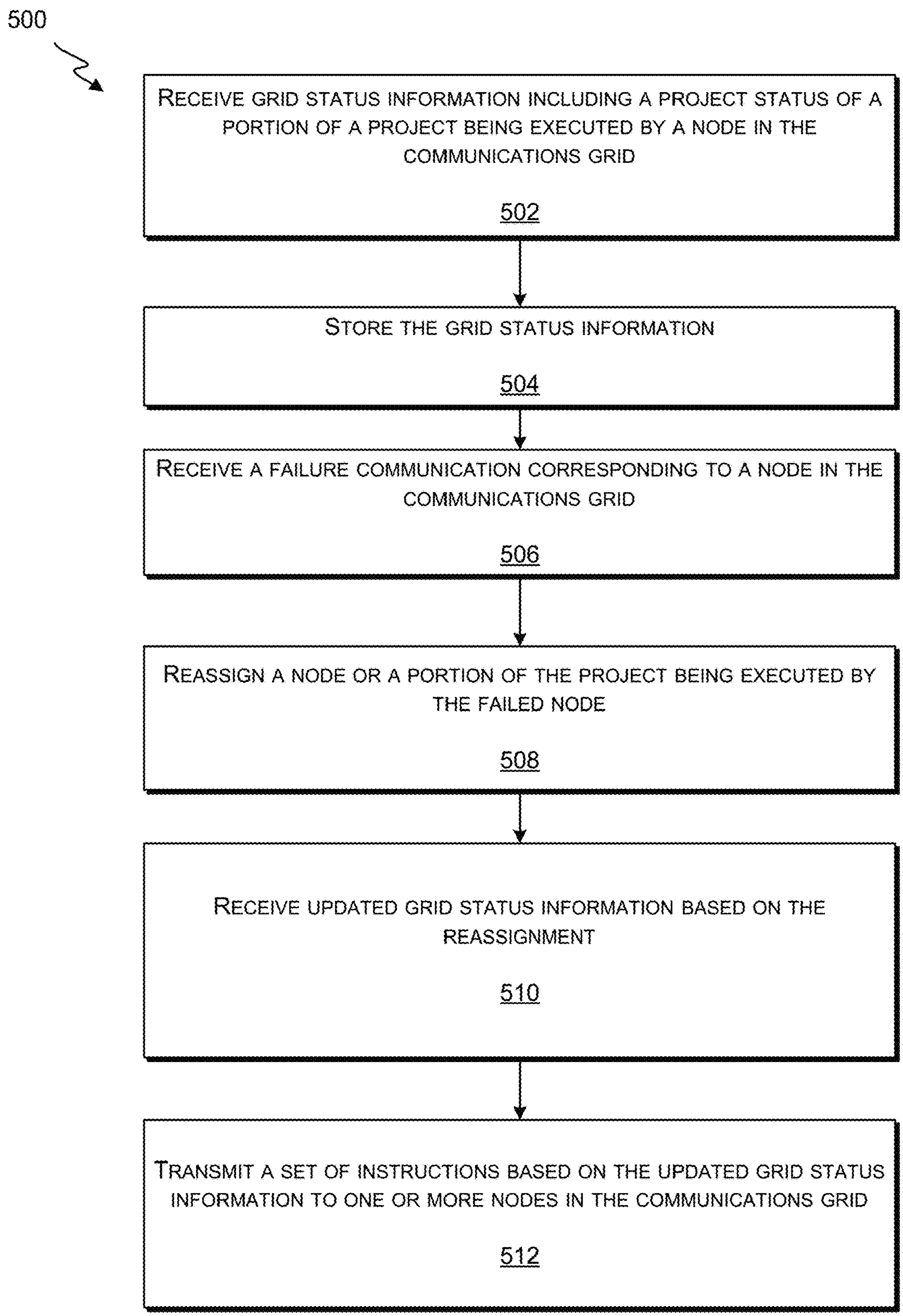
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
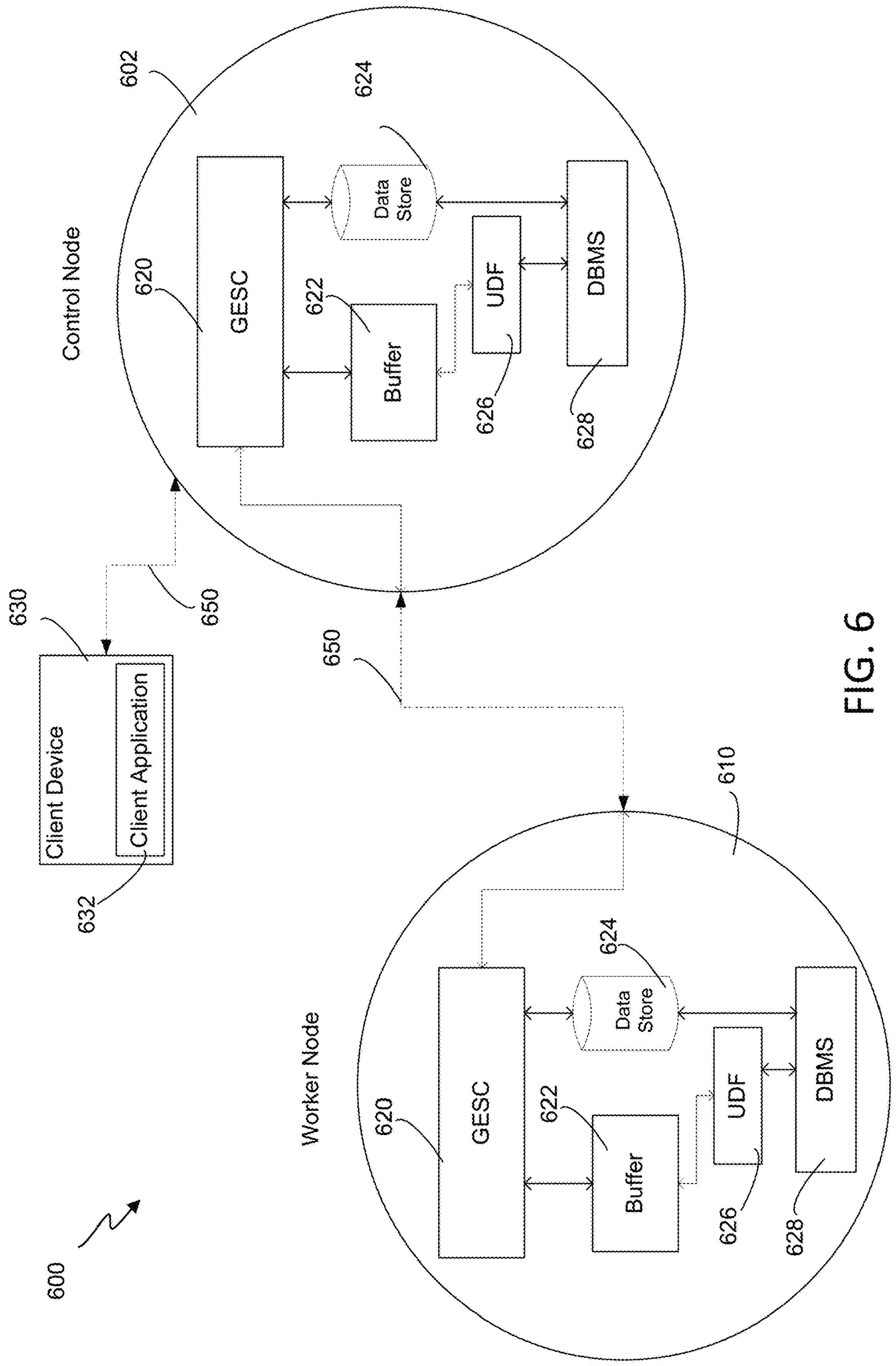
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
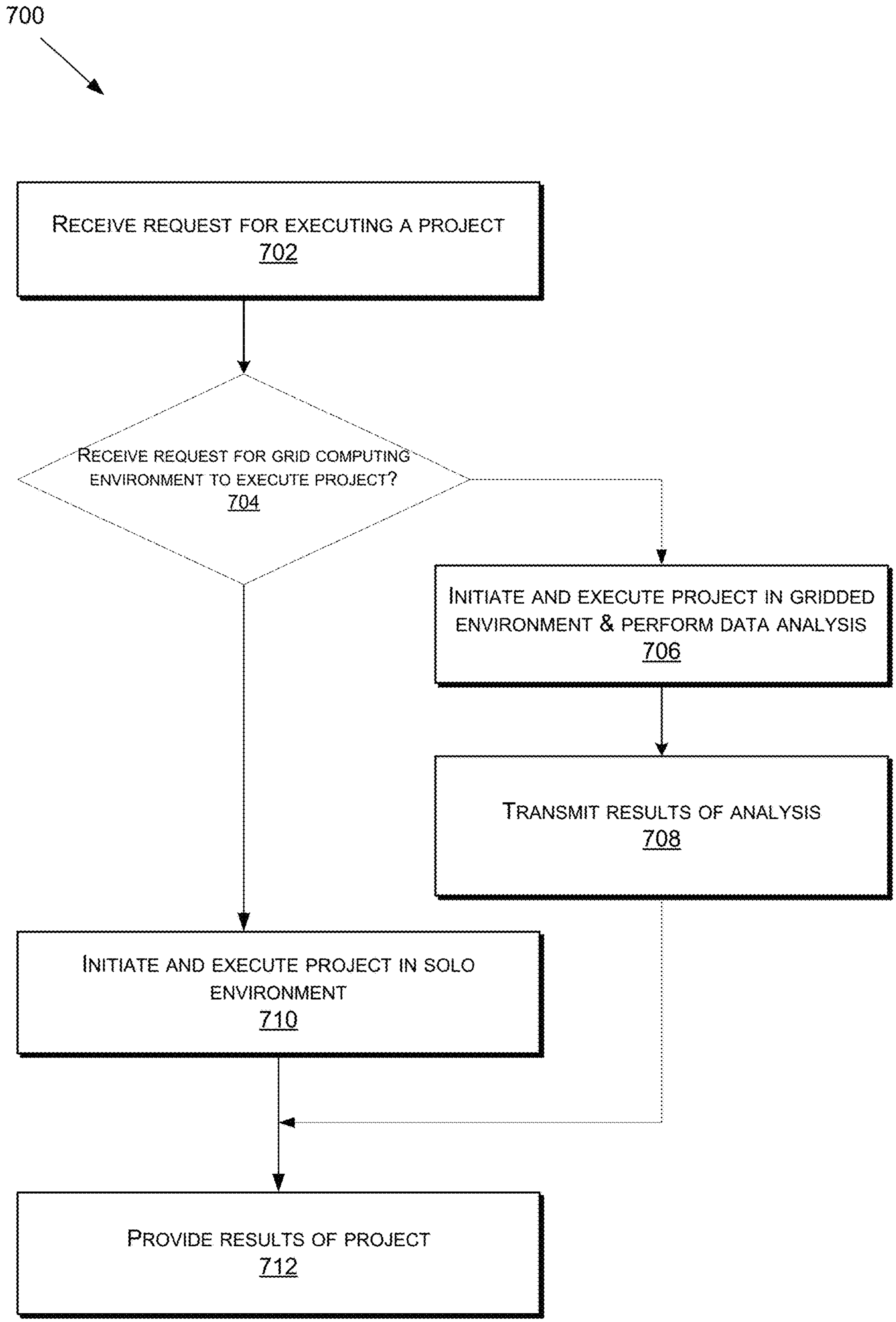
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or “event streams.” Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
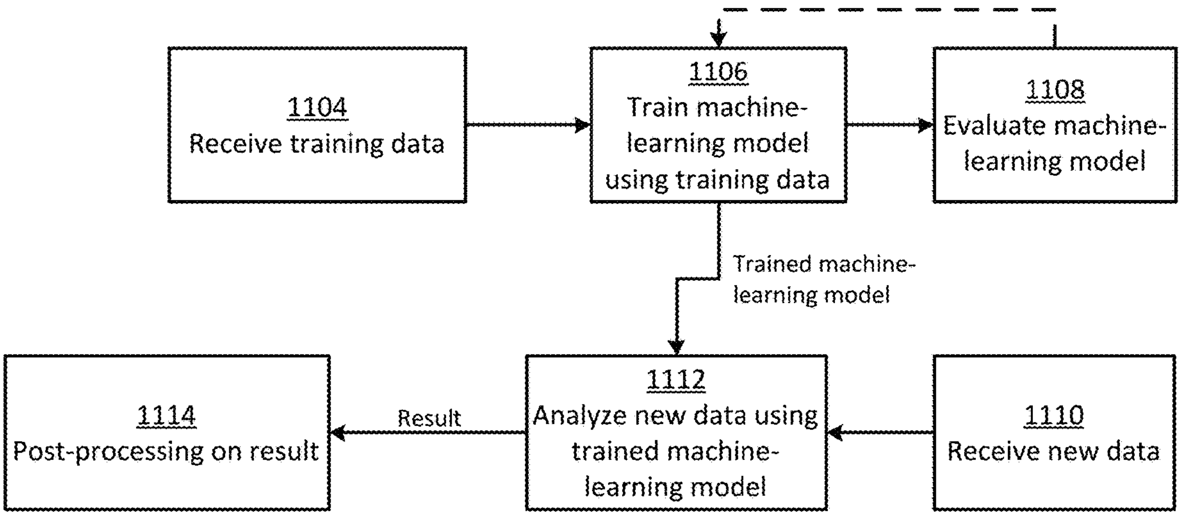
FIG. 11 illustrates a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
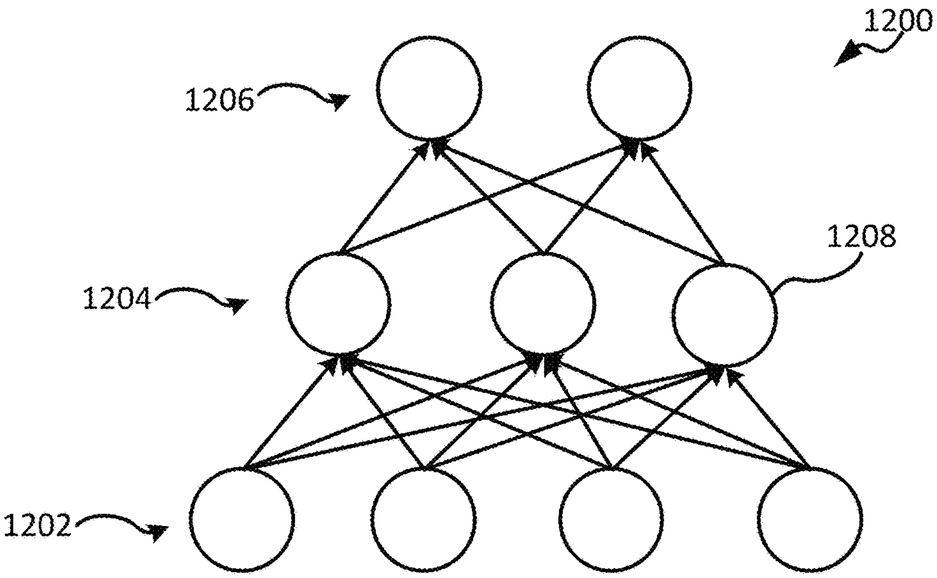
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector.

The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, processor(s) thermal mitigations, data communication speed improvements, and/or data efficiency targets and improvements throughout various parts of the system when compared to a homogeneous computing architecture that employs CPUs for general purpose computing.

Value Optimization

Exemplary embodiments provide a framework to address optimization problems (of which one example is the "customer journey problem") using reinforcement learning and neural networks. An objective is to train a policy, which chooses among available actions to maximize a long-term value. By following a properly-selected policy, the agent has the opportunity to influence the users' future preferences and effectively change their reactions in the next interaction points, motivating them to continue accruing additional value. To meet these requirements, a dynamically learning, interactive algorithm is needed, which keeps track of user reactions and adapts accordingly to users' behavioral changes.

Many machine learning algorithms are designed to be trained in supervised fashion. However, supervised learning is not applicable where, as in the contemplated applications of the present technology, the supervisors do not have information about the true long-term value to use for training labels.

An alternative to supervised learning is an offline reinforcement learning (RL) algorithm. RL algorithms rely on models that simulate environment transitions. The learning agent takes actions according to its own policy and then adjusts its policy with respect to the reward revived from the model. After a good policy is achieved it is deployed for use with real user interactions.

However, there are still challenges in a live environment that cannot be captured with the offline method. First of all, an offline policy is trained in an emulated environment, and there are likely to be differences in real-life interactions beyond those captured in the emulated environment. When the policy is deployed in the real-life environment, these differences need to be taken into consideration in a short period of time. For example, if the learning agent is intended to perform predictive hardware maintenance and is trained in an emulated environment, real-world breakage rates under normal use conditions may not be ask expected (thus requiring the learning agent to adjust its maintenance policies). If the learning agent is tasked with presenting digital advertisements to users, a subpopulation of the users may be unexpectedly offended by the advertisements, necessitating that the agent quickly stop showing the advertisements in question.

Figure 13A:
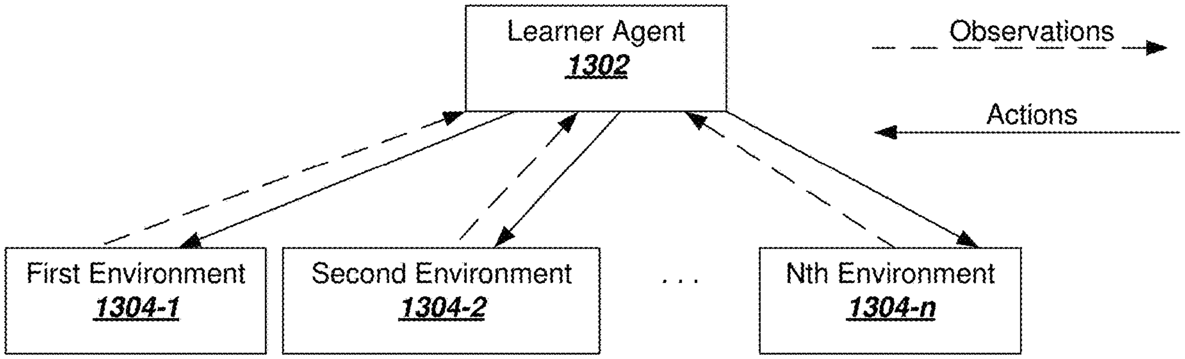
FIG. 13A depicts an exemplary system in which a learner agent operates across multiple environments.

The exemplary framework described herein addresses these and other issues in a two-stage approach, as illustrated in FIG. 13A. Note that FIG. 13A is intended to provide a succinct overview of the framework; each portion of the framework will be discussed in more detail with respect to FIGS. 14-16.

As illustrated in FIG. 13A, historical data 1302 about the environment in which the learner agent operates is initially received. The historical data 1302 may depend on the type of environment being emulated; for instance, if the learner agent is responsible for predictive maintenance, the historical data may include past hardware breakage rates and maintenance schedules. If the learner agent is responsible for coordinating an advertising campaign, for example, then historical information about the efficacy of previous advertising campaigns may be used. The historical data 1302 may be used to build a model of the environment in block 1304.

At block 1306, a reasonable policy is trained using the model of the environment. One suitable algorithm for training the policy is the Deep Q-Network (DQN) algorithm.

The policy, once initially trained, may be applied as a warm start policy to an online algorithm at block 1308. The online algorithm operates as a second stage configured to maximize the long-term reward while learning the dynamic elements of the complex environments. An example of a suitable online algorithm is the Deep Concurrent Temporal Difference (DCTD) algorithm.

Figure 13B:
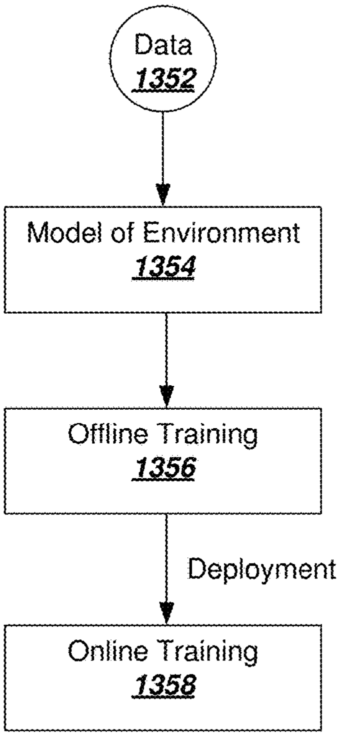
FIG. 13B is a flow chart depicting a general outline of a procedure according to exemplary embodiments.

The online portion of the approach may be used in a setting like the one depicted in FIG. 13B. Here, the learner agent 1352 (e.g., embodied by the DCTD algorithm) interacts with multiple environments 1354-1, 1354-2, . . . , 1354-*n*. The learner agent 1352 is capable of taking an action in one of the environments 1354-1 (which, at any given time point, may be no action or the null action). The learner agent 1352 chooses between different available actions according to its policy at the current time. The learner agent 1352 then observes the consequences of the action (e.g., the amount of value accrued, which may be aggregated over time) in the environment 1354-1 and determines whether to adjust its policy. If the learner agent 1352 adjusts its policy, it can apply the adjusted policy in a different environment 1354-2 and repeat the process. Therefore, information learned in one environment is carried over into others, allowing the agent 1352 to quickly alter its policies in view of real-world experience.

Figure 14:
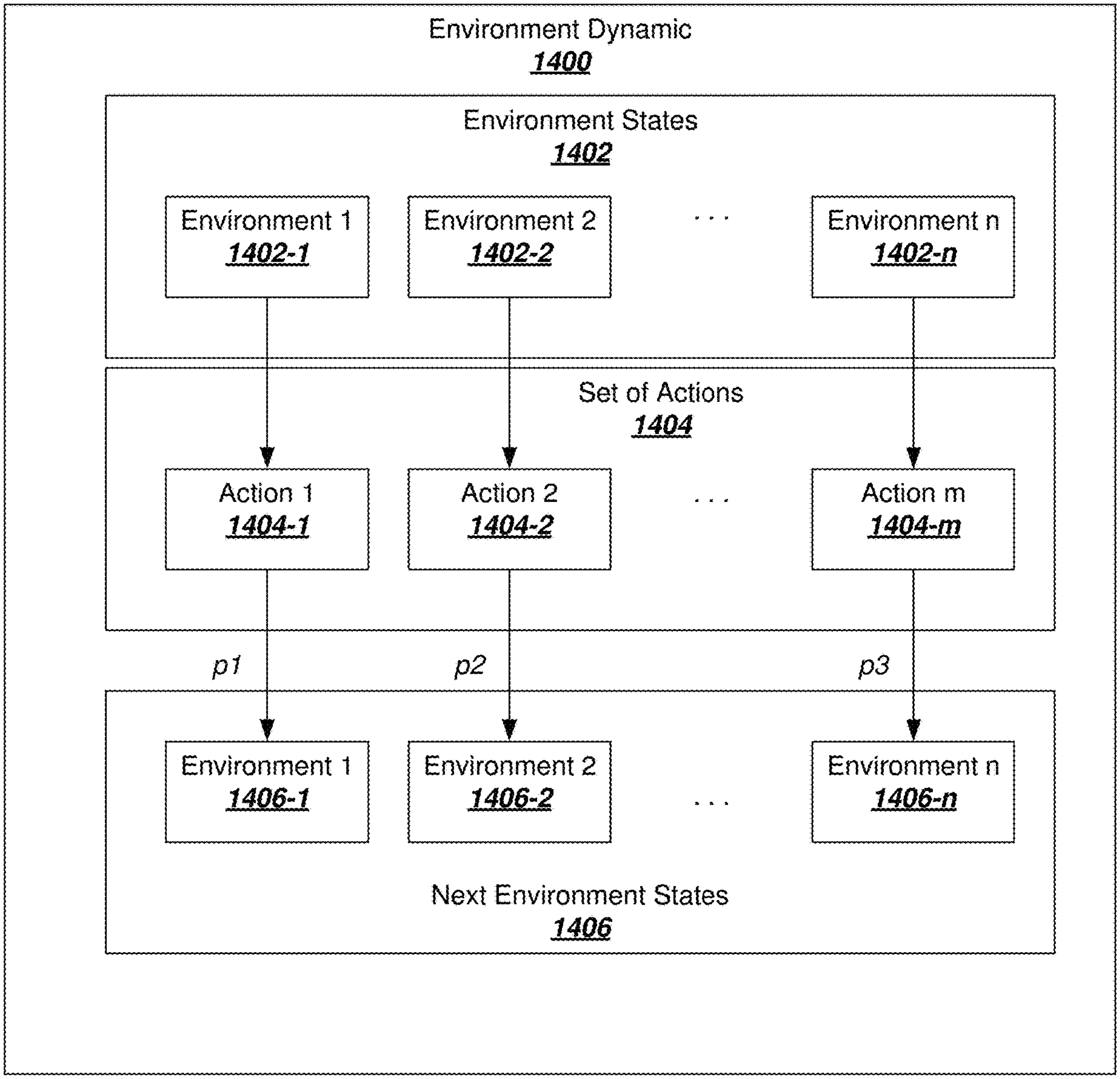
FIG. 14 depicts an exemplary environmental dynamic data structure suitable for use by a machine learning system according to exemplary embodiments.

As noted above, the learner agent chooses between available actions based on the current context, or environment dynamic, in an environment at the present time. FIG. 14 depicts an exemplary data structure representing such an environment dynamic 1400.

In a reinforcement learning setting, the agent interacts with its environment ε. Such an interaction may be formalized by a Markov Decision Process (MDP) described by a tuple (S, A, $P_t^i$, $R_t^i$). S defines the available state space 1402, which includes a plurality of possible states 1402-1, 1402-2, . . . , 1402-*n*. A represents the available actions that can be taken at any given time, and defines an action space 1404 including a plurality of possible actions 1404-1, 1404-2, . . . 1404-*n*.

Given the current state $s_t \in S$ 1402 at time t, the agent takes an action $a_t$ from the set of available actions A 1404 with respect to its policy π. The policy π is defined as a mapping from the set of states space to the actions set.

In response, the agent receives some value $r_t \in R_t^i$ as a reward and observes the next state $s_{t+1}$ (denoted in FIG. 14 by the available next states 1406-1, 1406-2, . . . 1406-*n* in the next state space 1406). Note that, in some embodiments, a given action in a particular environment might probabilistically cause the environment to transition to different states (e.g., action 1404-1 might transition to next state 1406-1 with probability $p_1$ and to next state 1406-2 with probability $p_2$). These probabilities may be given by $P_t^i$.

We denote by $$R_t = \Sigma_{i=t}^{\infty} = \gamma^{i-t} r_i \qquad \text{Eq. (1)}$$

the accumulated discounted value after time t with discount factor γ. The objective is to find an optimal policy π* which maximizes the long-term discounted value Q(s, a) from any states and following policy π*, where Q(s, a) is given by:

$$Q(s,a) = E(R_t | s,a) \qquad \text{Eq. (2)}$$

When the state space is large, it is unavoidable to use function approximators instead of directly calculating Q(s, a) for every state-action pair. One option is to use a deep neural network Q(s, a; θ)≈Q(s, a) because of its high capability in approximating complex non-linear functions. Updates to θ can be obtained by various reinforcement learning algorithms such as Q-learning where loss function:

$$\mathcal{L}_i(\theta_i) = \mathbb{E}\left[r + \max_{a'} Q(s', a'; \theta_{i-1}) - Q(s, a; \theta_i)\right]^2 \qquad \text{Eq (3)}$$

is iteratively minimized.

The DQN algorithm used in the above-described offline phase uses such a function approximator. Such a DQN algorithm relies on relatively little knowledge about the environment and primarily learns using sensory information and reward signals.

Figure 15:
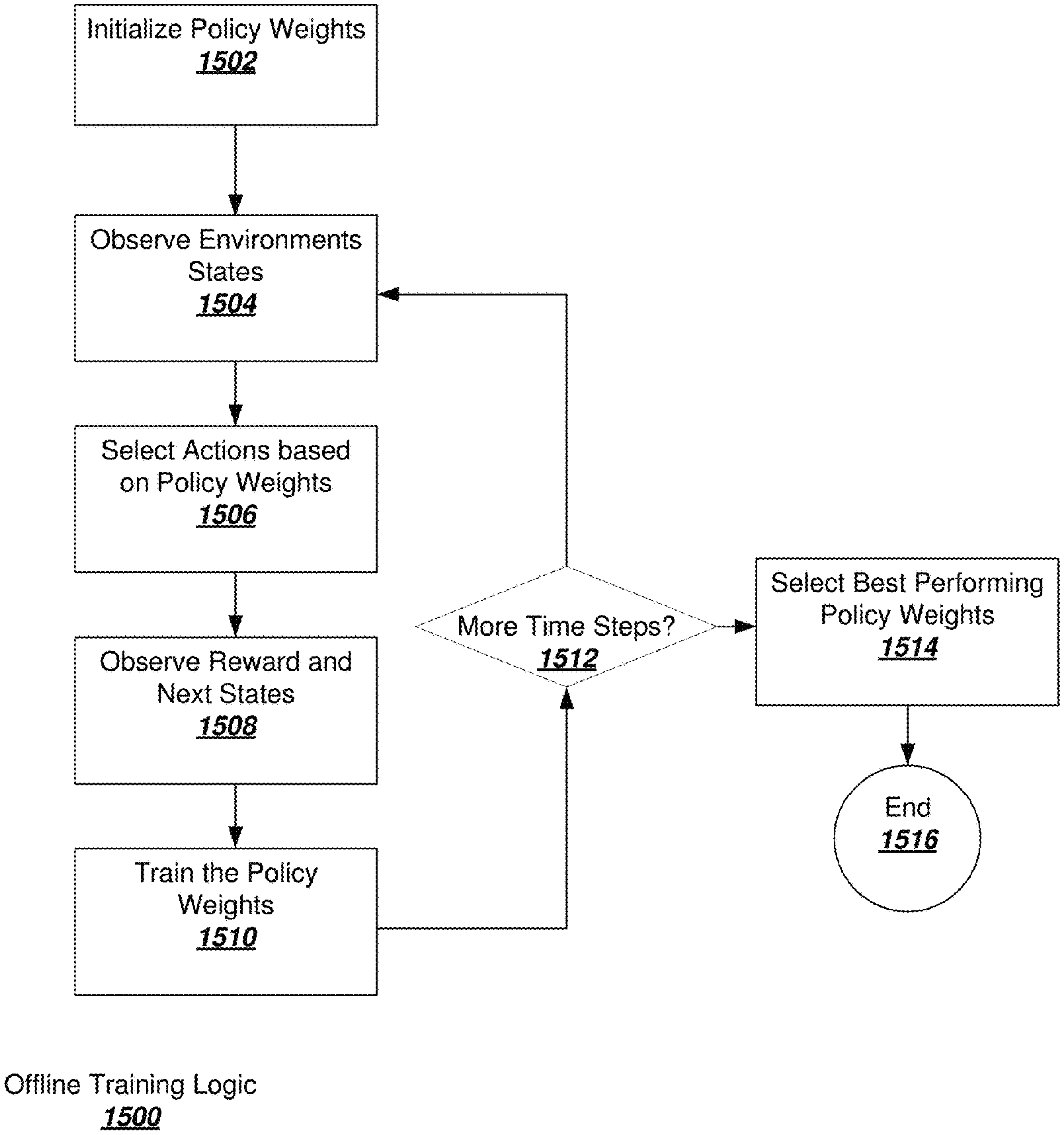
FIG. 15 is a flowchart depicting an exemplary process for offline learning.

FIG. 15 depicts exemplary offline training logic 1500 for training the initial policy using the DQN algorithm in the offline phase. Initially, a simulator is built by training a multilayer fully-connected neural network to predict the probability of the occurrence of a reward from a given state and action. Similarly, another network is trained to predict the amount of reward from a given state and action. A simulator suitable for use in exemplary embodiments is described in *Customer Simulation for Direct Marketing Experiments* by Y. Tkachenko et al.

By decoupling the output of these two networks, the reward amounts can be identified. Based on the reward amounts, policy weights are initialized at block 1502. The policy weights may be initialized in a greedy manner (e.g., by assigning the most weight to the policy that achieves the highest amount of value immediately), or may be initialized in other manners (e.g., random).

Next, we consider an agent interacting with a set of users C. In exemplary embodiments, we consider the case that at every time step t, the agent is required to take an action only for a subset of users $C_t^a \subset C$ and for the rest of the users the agent chooses to do no action. For example, in a predictive maintenance scenario in which server farms are maintained in different locations, the agent may choose to perform maintenance on servers in one facility but not another. Similarly, at every time t, the agent updates its policy based on a subset of the users $C_t^u \subset C$. $C_t^u \subset C$ may include users associated with a positive value at time t, or the users with no recent activity (to model attrition). The set of users C may vary over time, as new users are added or removed.

$\tau_t$, t=0, 1, . . . represents the sequence of time points when either the agent needs to take an action for a user or update the policy (i.e., $\tau_t$ is the time point where $C_t^u \cup C_t^a \neq \emptyset$). At each time step t, the agent observes the state of each customer $i \in C_t^a$ denoted by $s_t^i$ (block 1504) and chooses an action $a_t^i$ from the set of available actions A (block 1506). After executing the actions, the agent observes the value of the users (block 1508) and updates their next states (block 1510). At block 1510, the agent may optionally update its policy weights if one course of action yields more or less value than expected. The process then repeats (block 1512) for each available time step. At the end of the training process, the policy weights yielding the highest value over time are chosen to be used in the online process (block 1514).

During this offline training, each user is treated individually; the agent interacts with each until the end of the time steps in block 1514 before moving on to the next user. Consequently, the agent learns from the entire user trajectory, which is an advantageous result that would not be achieved in a live environment.

It is noteworthy that the simulator might not represent the "real" environment, and as a result the policy trained using the simulator might differ from the optimal one. Nonetheless, in practical tests the online algorithm (depicted in FIG. 16) typically addresses these inaccuracies and adapts relatively quickly.

According to exemplary embodiments, an extension of the concurrent temporal difference (TD) algorithm may be used in the online process. During the online process, a stream of information describing present dynamics of the environment is received. Time progresses linearly, so it is not possible in the live environment to follow one user through time before updating the policies and applying them to other users.

Figure 16:
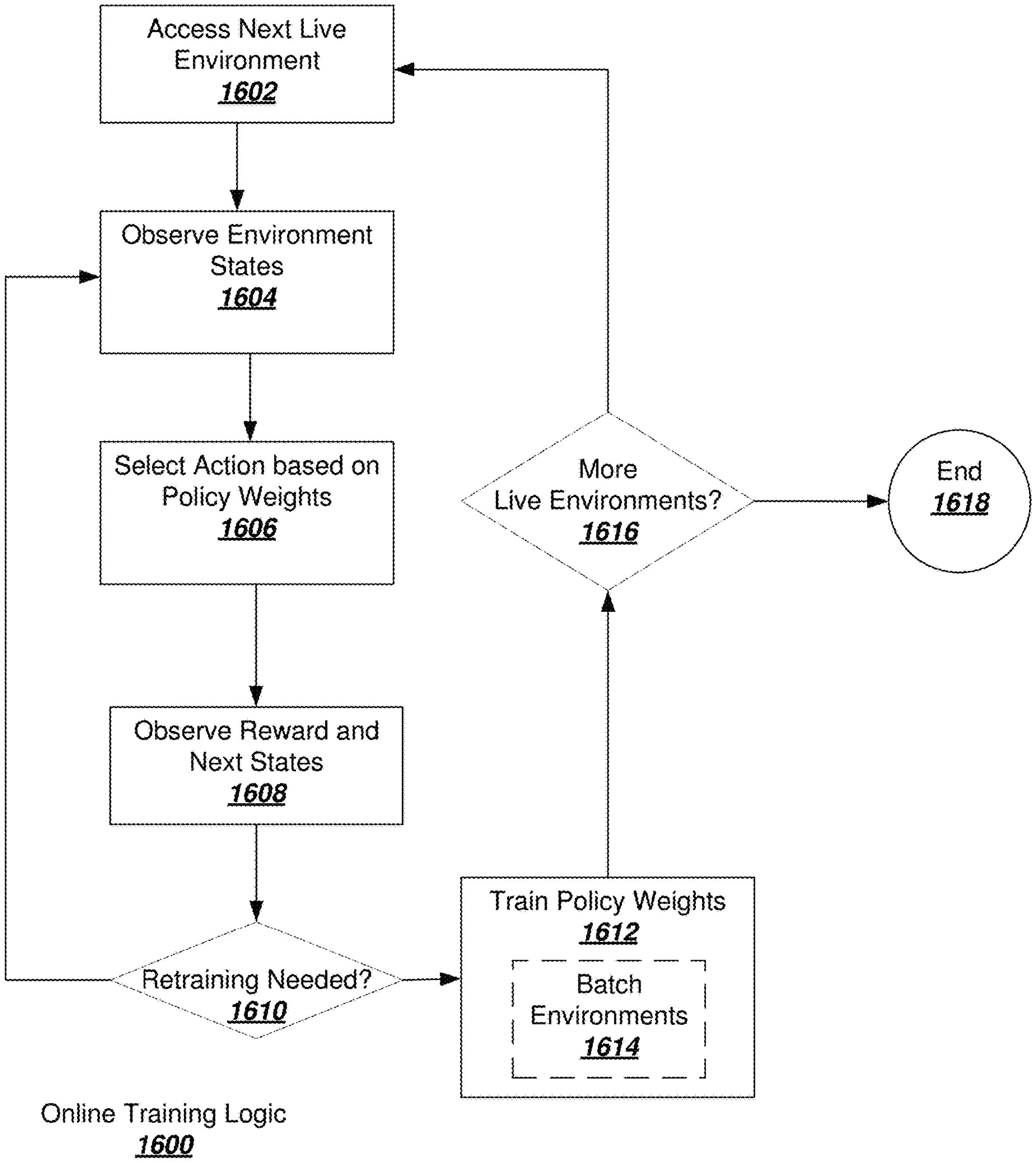
FIG. 16 is a flowchart depicting an exemplary process for online learning.

As shown in the online training logic 1600 depicted in FIG. 16, the learner agent first chooses (block 1602) a live environment with which to interact—as previously noted in connection with FIG. 13B, the agent interacts with multiple different environments to learn appropriate policies and apply them in new contexts. At block 1604, the learner agent retrieves the stream of information representing the current environment's dynamics and determines the current state of the environment.

At block 1606, the learner agent selects an action to be taken based on the current state of the environment and the policy traits (as pre-trained by the offline training process and subsequently modified by feedback loops through the online training process). According to one embodiment, the agent may use an ∈-greedy rule to select the actions; in an ∈-greedy rule, the actions are selected at random with probability ∈, and otherwise according to the agent's policy. This allows for some variation and experimentation while generally adhering to the trained policy. According to some embodiments, the value of ∈ may be fixed through the online process. Preferably, ∈ is selected so as to be not so large as to encourage excessive random actions, but not so small so as to limit the exploratory behavior of the algorithm.

The agent applies the selected action and observes the next state of the environment (as well as the accumulated value) at block 1608. At block 1610, the agent determines if retraining of the policy weights is needed. Different criterion may be used to determine if retraining is needed or, in some embodiments, retraining may be applied at every time step.

If retraining is to be applied, then at block 1612 the agent adjusts the policy weights. In some embodiments, policy weight adjustment may be performed based on user batching, as illustrated at block 1614. In these embodiments, users are assigned to a batch $B_t^j$ (each user may be permitted to appear in more than one batch, which is more data efficient than assigning each user to a disjoint batch) and policy weights are adjusted based on the batch by updating the policy weights in the direction of reducing the temporal difference error according to Eq (4):

$$\Delta\theta = \frac{-2\alpha}{|\mathcal{B}_t^u|} \sum_{\{i:E_i \in \mathcal{B}_i^u\}} \begin{bmatrix} R^i_{u^i:t} + \gamma^{\tau_t - \tau^i_u} Q(s^i_t, a^i_t; \theta^-) - \\ Q(s^i_{u^i}, a^i_{u^i}; \theta) \end{bmatrix} \nabla_\theta Q(s^i_{u^i}, a^i_{u^i}; \theta) \quad \text{Eq (4)}$$

$$\text{where } R^i_{u^i:t} = \sum_{k=u^i}^{t} \gamma^{\tau_k - \tau_{u^i}} r^i_k$$

It has been found that the combination of concurrent TD with deep neural networks may be fundamentally unstable. To address this issue, a non-trainable target network with weights $\theta^-$ in which its weights are synchronized with the original network every K training steps.

The process may repeat (block 1616) as long as actions are received for the various live environments. When there is no more data to be processed, processing may terminate (block 1618).

Figure 17A:
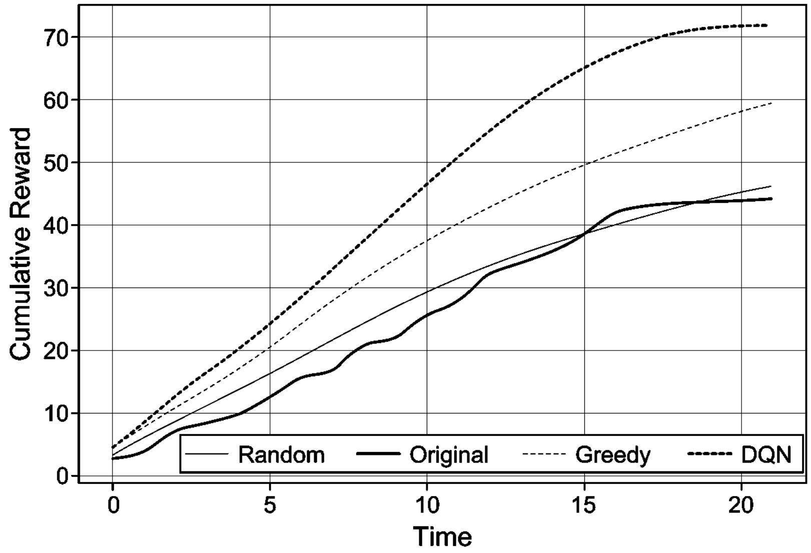
FIGS. 17A-17B are graphs depicting experimental results of a system implemented according to exemplary embodiments.
Figure 17B:
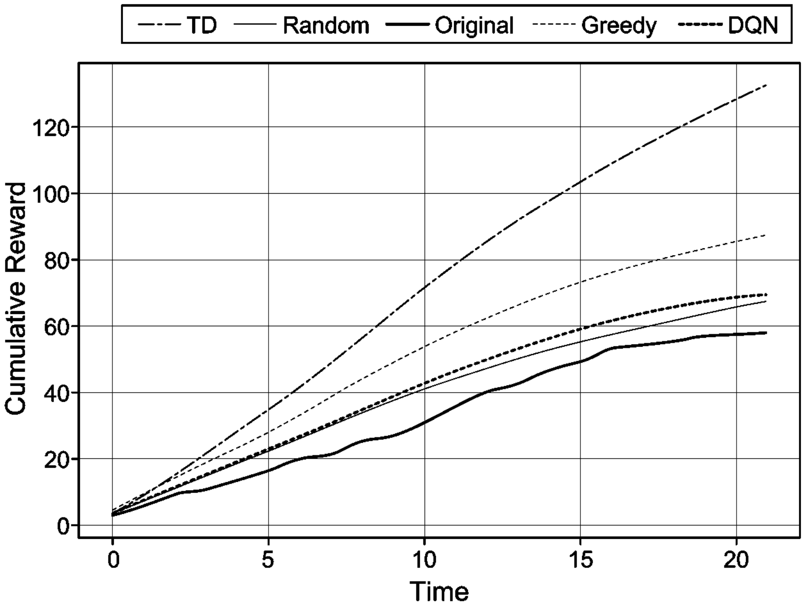

In pseudo-code, the above described procedure could be represented as follows:

Algorithm 1 initialize a network Q with random weights $\theta$<br>
initialize a target network Q with weights $\theta^- \leftarrow \theta$<br>
$R^i \leftarrow 0, u^i \leftarrow 0$ for every $E^i \in E$<br>
for every time-step t do:<br>
  $a_t^i \leftarrow \emptyset$ for every $E^i \in E$<br>
  for training steps $j = 1, \ldots, b_t$ do<br>
    take batch of environments $B_t^j \subset E_t^u$<br>
    if environment $E^i \in B_t^j \cap E_t^a$ then<br>
      choose action $a_t^i \leftarrow \in - \text{greedy}(Q)$<br>
    end if<br>
    for environment $E^i \in B_t^j$ do:<br>
      set $y^i = R^i + \gamma^{t-u^t} Q(s_t^i, a_t^i, \theta^-)$<br>
    end for<br>
    perform a gradient descent step on<br>
      $(y^i - Q(s_u{}^i, a_u{}^i, \theta))^2$ with respect to $\theta$<br>
  end for<br>
  $a_t^i \leftarrow \text{greedy}(Q)$ for every $E^i \in E_t^a \setminus \cup_{j=1}^{b_t} B_t^j$<br>
  Execute actions $a_t^i$, get reward $r_t^i$ and $s_{t+1}{}^i$ for all i<br>
  for every $E^i \in E$ with reward $r_t^i > 0$ do<br>
    $R^i \leftarrow R^i + \gamma^{\tau t - \tau_u t} r_t^i$<br>
  end for<br>
  $R^i \leftarrow 0, u^i \leftarrow t$ for every $E^i \in E_t^u$<br>
  Every K training step, $\theta^- \leftarrow \theta$<br>
end for FIG. 17A and FIG. 17B depict experimental results of applying the above-described framework to a customer journey problem, using data from a marketing dataset (KDD1998) for an outbound mailing campaign. In this example, a DNN was used for both the DQN and DCTD algorithms, where the DNN is fully connected and uses four hidden layers and ReLU activation. The DQN network was trained for 100,000 users, each propagated for 23 periods. The DCTD algorithm is also concurrently trained with 153,000 users. A minibatch of 256 users was selected at every time-step of the DCTD algorithm and $b_t$=600. For DCTD, $\gamma$ was set to 0.99 and E was set to 0.1.

For comparison, three benchmark policies are provided: (i) an original policy, which uses the actions stored in the original training dataset; (ii) a random policy, in which the action for each user in each period is picked randomly; and (iii) a myopic policy which chooses actions with the maximum immediate reward (i.e., long-term rewards are not taken into account).

FIG. 17A shows the results when only a DQN (offline training) algorithm is used, compared to the benchmark policies. As depicted, the policy learned by the DQN has a higher long-term reward as compared to the other policies. When an online DCTD algorithm is pre-trained with a DQN warm-start (FIG. 17B), the result follows the DQN path initially but quickly improves as the DCTD algorithm detects live system dynamics. By adapting its policy, DCTD is able to provide far better cumulative rewards compared to the offline algorithms. These experiments show a significant positive impact from utilizing the proposed framework.

In some implementations, for example, the learner agent may employ a mechanical robotic arm that is used to automatically stack bricks in an outdoor construction environment with the live system dynamics described herein, or a robotic arm that is used to automatically assemble parts on various automobiles in an automobile assembly factory environment using computer vision and multiple physical sensors with the warm start and live system dynamics described herein. In other implementations, various applications of the disclosed framework in Robotic Process Automation (RPA) can lead to large-scale improvements in repetitive maintenance environments, the robotic augmentation of activities, and the automation of tasks that are beyond the physical, perceptual and workflow abilities of humans. The preceding description provides example embodiments only, and is not intended to limit the scope, applicability, or configuration of the disclosure. Rather, the description of the example embodiments provides those skilled in the art with an enabling description for implementing an example embodiment. It should be understood that various changes may be made in the function and arrangement of elements without departing from the spirit and scope of the technology as set forth in the appended claims.

Specific details are given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

What is claimed is:

1. A non-transitory computer-readable medium storing instructions that, when executed by one or more processors, cause the one or more processors to train an agent, the instructions comprising instructions for:

building a model of an environment using historical information about the environment, wherein the model references a plurality of dynamics of the environment as the agent interacts with the environment, each dynamic comprising:

a current state of the environment, an action to be performed, a value associated with the action, and a next state of the environment to which the current state transitions after taking the action;

training an initial policy using an offline process acting on the model of the environment, the initial policy represented as a deep neural network (DNN) defined by a plurality of policy weights that prioritize between available actions to identify a selected action;

incorporating the initial policy into an online process acting in a first live environment, the online process being free of a model that simulates the plurality of dynamics of the environment, the first live environment defined by an online stream of information describing present dynamics of the first live environment, wherein the online process is a deep concurrent temporal difference (DCTD) algorithm that:

observes a state of the first live environment;

identifies a plurality of possible actions to be taken in a first live environment;

selects an action from among the plurality of possible actions, the action being selected by applying the DNN with the online process to evaluate a value over time resulting from the actions in view of the present dynamics of the first live environment in view of the policy weights;

observes a value associated with the selected action;

retrains the online process based on the observed value by updating the policy weights defining the DNN in a direction of reducing a temporal difference error associated with the DNN; and applying the retrained online process in a second live environment defined by a different online stream of information defining different dynamics as compared to the first live environment, where the online process acts concurrently in the first live environment and the second live environment.

2. The non-transitory computer-readable medium of claim 1, wherein the agent is configured to select from among a plurality of available actions to maximize an expected value over time, and application of the initial policy trained using the offline process reduces a number of errors associated with applying the initial policy in the first live environment and increases an expected value over time as compared to a system in which the initial policy is not developed using the offline algorithm.

3. The non-transitory computer-readable medium of claim 1, wherein the dynamics further comprise a plurality of next states and a probability of transitioning to each of the next states given that the action is taken.

4. The non-transitory computer-readable medium of claim 3, wherein the online process is configured to capture changes of dynamics in the environment caused by changing one or more of the reward for taking the action or the probability of transitioning to a next state given that the action is taken.

5. The non-transitory computer-readable medium of claim 1, wherein the policy weights are updated based on observation of a plurality of live environments at a given time.

6. The non-transitory computer-readable medium of claim 5, wherein the agent interacts with the plurality of live environments in parallel by taking actions in respective live environments during overlapping periods of interaction with the live environments.

7. The non-transitory computer-readable medium of claim 5, wherein updating the policy weights comprises:

dividing the plurality of live environments into training batches, wherein at least one live environment is permitted to appear in multiple batches;

observing respective values for respective actions in each of the plurality of live environments;

aggregating the observed respective values; and updating the policy weights based on the aggregated value.

8. The non-transitory computer-readable medium of claim 1, wherein the training comprises:

(1) at each of a plurality of time steps, receiving the environment dynamics and storing the environment dynamics in a memory, (2) at each of the plurality of time steps, selecting an action from among available actions based on the policy weights, (3) repeating (1) and (2) until a final time step is reached, (4) at the final time step of the plurality of time steps, determining a total value amount given the selected actions, (5) comparing the total value for different training sessions defined by different starting policy weights, and (6) selecting the policy weights based on which of the policy weights maximize the total value.

9. The non-transitory computer-readable medium of claim 1, wherein updating the policy weights causes a reduction in a temporal difference error in the online process.

10. The non-transitory computer-readable medium of claim 1, wherein the DCTD algorithm applies an ∈-greedy rule to select the action, the ∈-greedy rule causing the action to be selected at random with probability ∈, and otherwise according to the policy weights.

11. A method for training an agent, the method comprising:

building a model of an environment using historical information about the environment, wherein the model references a plurality of dynamics of the environment as the agent interacts with the environment, each dynamic comprising:

a current state of the environment, an action to be performed, a value associated with the action, and a next state of the environment to which the current state transitions after taking the action;

training an initial policy using an offline process acting on the model of the environment, the initial policy represented as a deep neural network (DNN) defined by a plurality of policy weights that prioritize between available actions to identify a selected action;

incorporating the initial policy into an online process acting in a first live environment, the online process being free of a model that simulates the plurality of dynamics of the environment, the first live environment defined by an online stream of information describing present dynamics of the first live environment, wherein the online process is a deep concurrent temporal difference (DCTD) algorithm that:

observes a state of the first live environment;

identifies a plurality of possible actions to be taken in a first live environment;

selects an action from among the plurality of possible actions, the action being selected by applying the DNN with the online process to evaluate a value over time resulting from the actions in view of the present dynamics of the first live environment in view of the policy weights;

observes a value associated with the selected action;

retrains the online process based on the observed value by updating the policy weights defining the DNN in a direction of reducing a temporal difference error associated with the DNN; and applying the retrained online process in a second live environment defined by a different online stream of information defining different dynamics as compared to the first live environment, where the online process acts concurrently in the first live environment and the second live environment.

12. The method of claim 11, wherein the agent is configured to select from among a plurality of available actions to maximize an expected value over time, and application of the initial policy trained using the offline process reduces a number of errors associated with applying the initial policy in the first live environment and increases an expected value over time as compared to a system in which the initial policy is not developed using the offline algorithm.

13. The method of claim 11, wherein the dynamics further comprise a plurality of next states and a probability of transitioning to each of the next states given that the action is taken.

14. The method of claim 13, wherein the online process is configured to capture changes of dynamics in the environment caused by changing one or more of the reward for taking the action or the probability of transitioning to a next state given that the action is taken.

15. The method of claim 11, wherein the policy weights are updated based on observation of a plurality of live environments at a given time.

16. The method of claim 15, wherein the agent interacts with the plurality of live environments in parallel by taking actions in respective live environments during overlapping periods of interaction with the live environments.

17. The method of claim 15, wherein updating the policy weights comprises:

dividing the plurality of live environments into training batches, wherein at least one live environment is permitted to appear in multiple batches;

observing respective values for respective actions in each of the plurality of live environments;

aggregating the observed respective values; and updating the policy weights based on the aggregated value.

18. The method of claim 11, wherein the training comprises:

(1) at each of a plurality of time steps, receiving the environment dynamics and storing the environment dynamics in a memory, (2) at each of the plurality of time steps, selecting an action from among available actions based on the policy weights, (3) repeating (1) and (2) until a final time step is reached, (4) at the final time step of the plurality of time steps, determining a total value amount given the selected actions, (5) comparing the total value for different training sessions defined by different starting policy weights, and (6) selecting the policy weights based on which of the policy weights maximize the total value.

19. The method of claim 11, wherein updating the policy weights causes a reduction in a temporal difference error in the online process.

20. The method of claim 11, wherein the DCTD algorithm applies an ∈-greedy rule to select the action, the ∈-greedy rule causing the action to be selected at random with probability ∈, and otherwise according to the policy weights.

21. An apparatus configured to train an agent implemented at least partially in hardware, the apparatus comprising:

a non-transitory device-readable medium storing a model of an environment using historical information about the environment, wherein the model references a plurality of dynamics of the environment as the agent interacts with the environment, each dynamic comprising:

a current state of the environment, an action to be performed, a value associated with the action, and a next state of the environment to which the current state transitions after taking the action;

a hardware processor circuit;

offline training logic implemented at least partially in hardware and configured to train an initial policy using an offline process acting on the model of the environment, the initial policy represented as a deep neural network (DNN) defined by a plurality of policy weights that prioritize between available actions to identify a selected action;

online training logic implemented at least partially in hardware and configured to:

incorporate the initial policy into an online process acting in a first live environment, the online process being free of a model that simulates the plurality of dynamics of the environment, the first live environment defined by an online stream of information describing present dynamics of the first live environment, wherein the online process is a deep concurrent temporal difference (DCTD) algorithm that:

observes a state of the first live environment;

identifies a plurality of possible actions to be taken in a first live environment, selects the online process to select an action from among the plurality of possible actions, the action being selected by applying the DNN with the online process to evaluate a value over time resulting from the actions in view of the present dynamics of the first live environment in view of the policy weights, observes a value associated with the selected action, and retrains the online process based on the observed value by updating the policy weights defining the DNN in a direction of reducing a temporal difference error associated with the DNN; and application logic implemented at least partially in hardware and configured to apply the retrained online process in a second live environment defined by a different online stream of information defining different dynamics as compared to the first live environment, where the online process acts concurrently in the first live environment and the second live environment.

22. The apparatus of claim 21, wherein the agent is configured to select from among a plurality of available actions to maximize an expected value over time, and application of the initial policy trained using the offline process reduces a number of errors associated with applying the initial policy in the first live environment and increases an expected value over time as compared to a system in which the initial policy is not developed using the offline algorithm.

23. The apparatus of claim 21, wherein the dynamics further comprise a plurality of next states and a probability of transitioning to each of the next states given that the action is taken.

24. The apparatus of claim 23, wherein the online process is configured to capture changes of dynamics in the environment caused by changing one or more of the reward for taking the action or the probability of transitioning to a next state given that the action is taken.

25. The apparatus of claim 21, wherein the policy weights are updated based on observation of a plurality of live environments at a given time.

26. The apparatus of claim 25, wherein the agent interacts with the plurality of live environments in parallel by taking actions in respective live environments during overlapping periods of interaction with the live environments.

27. The apparatus of claim 25, wherein updating the policy weights comprises:

dividing the plurality of live environments into training batches, wherein at least one live environment is permitted to appear in multiple batches;

observing respective values for respective actions in each of the plurality of live environments;

aggregating the observed respective values; and updating the policy weights based on the aggregated value.

28. The apparatus of claim 21, wherein the training comprises:

(1) at each of a plurality of time steps, receiving the environment dynamics and storing the environment dynamics in a memory, (2) at each of the plurality of time steps, selecting an action from among available actions based on the policy weights, (3) repeating (1) and (2) until a final time step is reached, (4) at the final time step of the plurality of time steps, determining a total value amount given the selected actions, (5) comparing the total value for different training sessions defined by different starting policy weights, and (6) selecting the policy weights based on which of the policy weights maximize the total value.

29. The apparatus of claim 21, wherein updating the policy weights causes a reduction in a temporal difference error in the online process.

30. The apparatus of claim 21, wherein the DCTD algorithm applies an $\in$-greedy rule to select the action, the $\in$-greedy rule causing the action to be selected at random with probability $\in$, and otherwise according to the policy weights.

* * * * *